D. R. CAMPBELL.
TRIMMING MACHINE FOR RUBBER ARTICLES.
APPLICATION FILED JULY 29, 1918.
1,308,479.  Patented July 1, 1919.
5 SHEETS—SHEET 1.
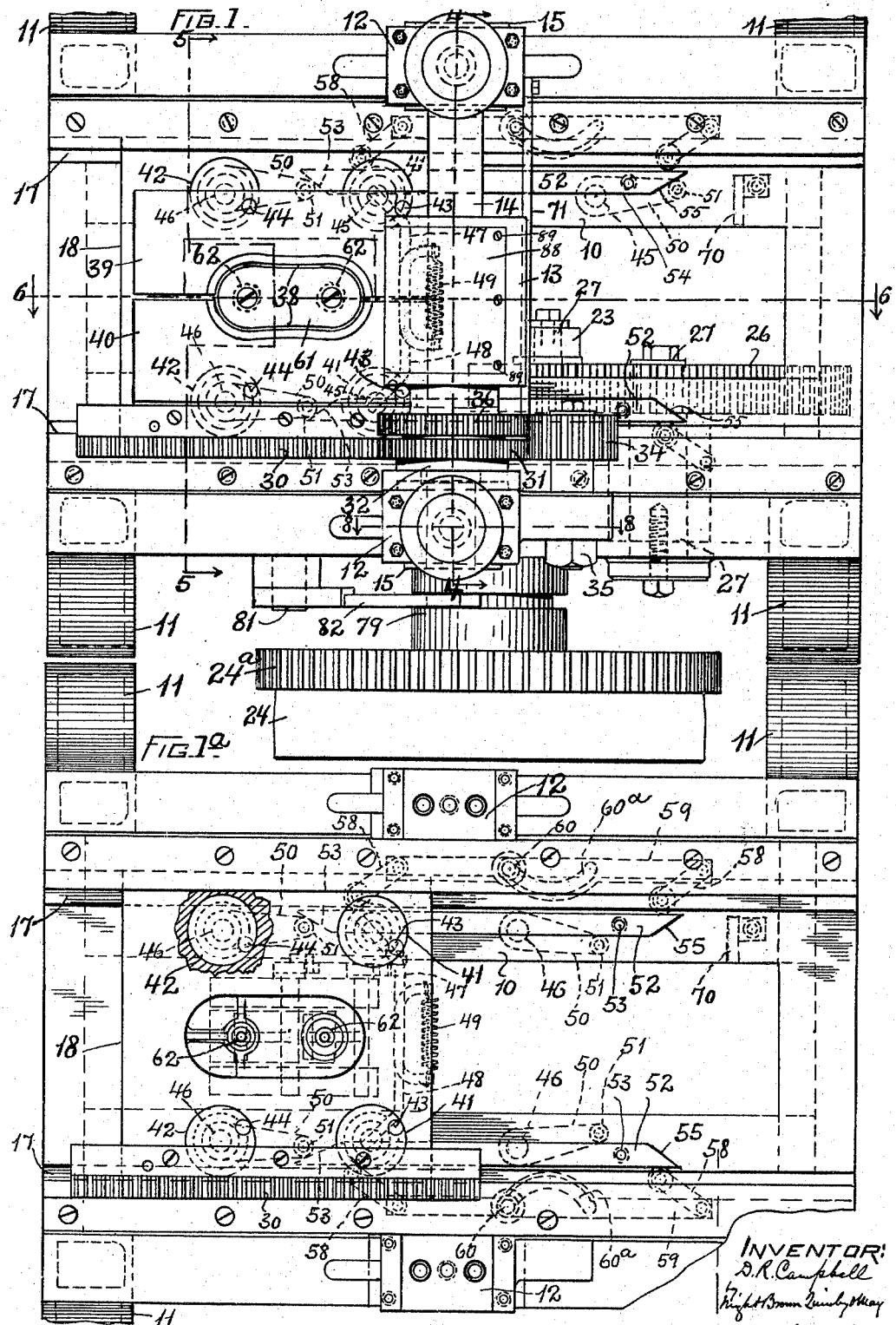

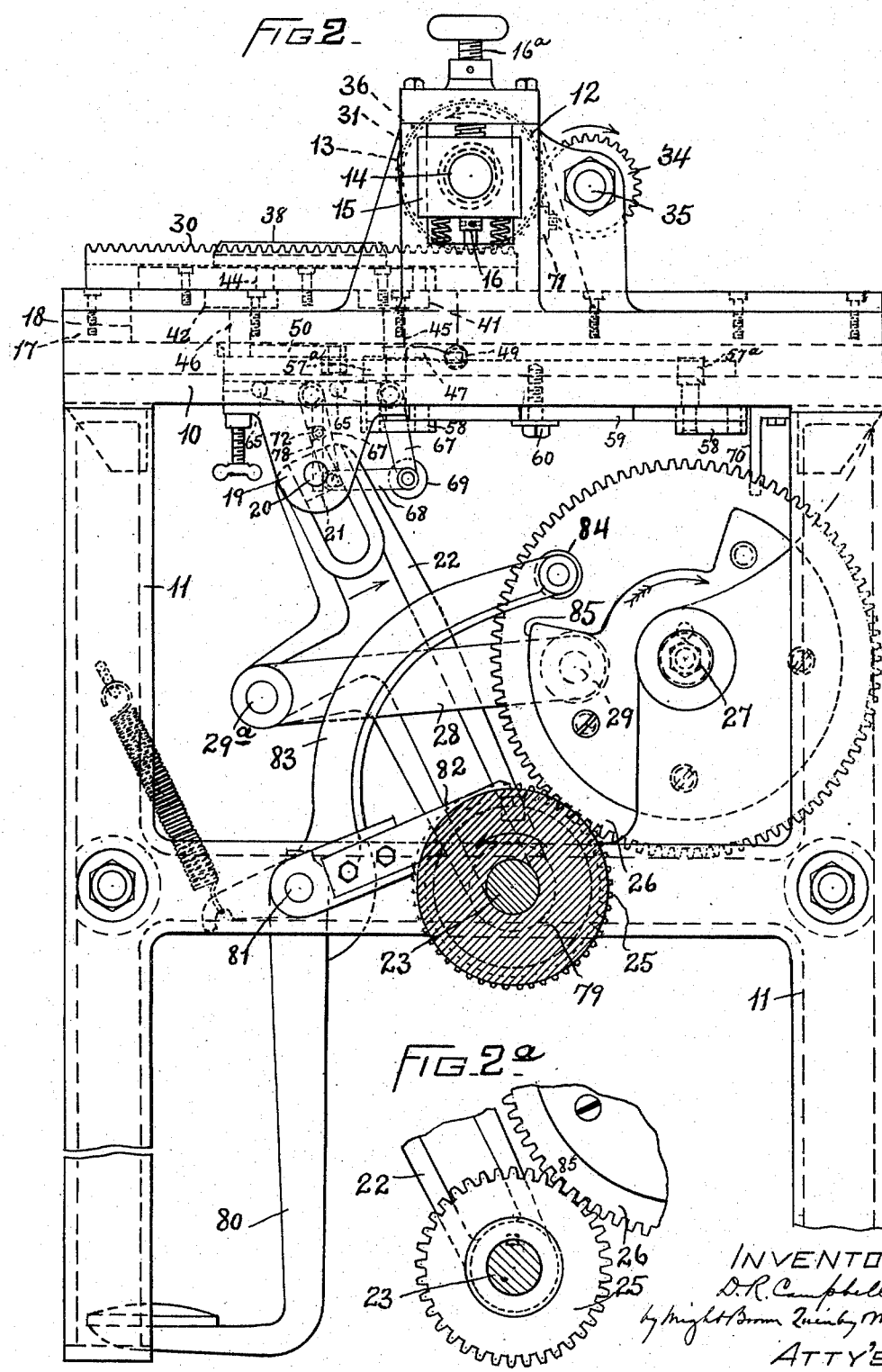

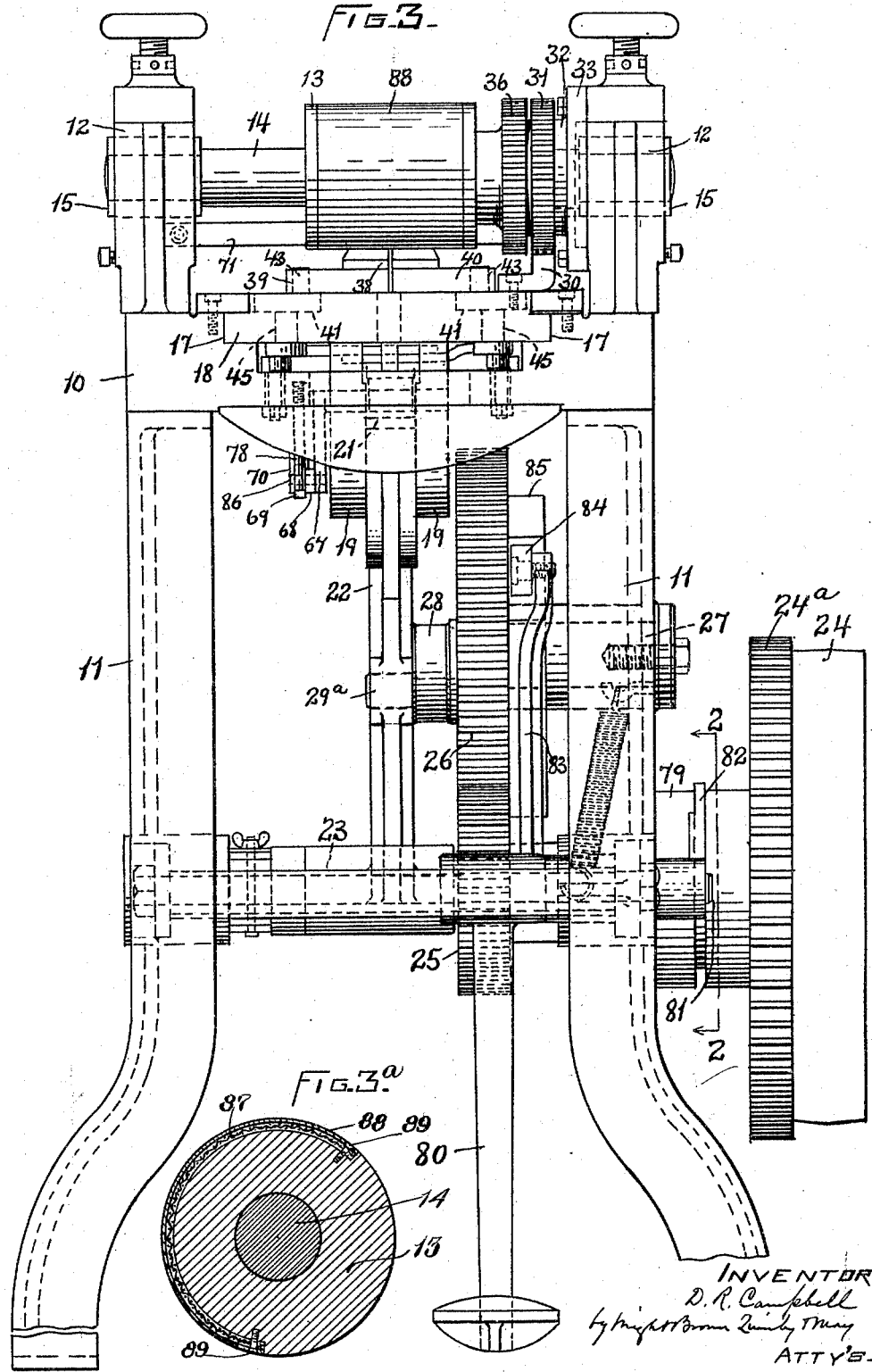

D. R. CAMPBELL.
TRIMMING MACHINE FOR RUBBER ARTICLES.
APPLICATION FILED JULY 29, 1918.
1,308,479.
Patented July 1, 1919.
5 SHEETS—SHEET 4.
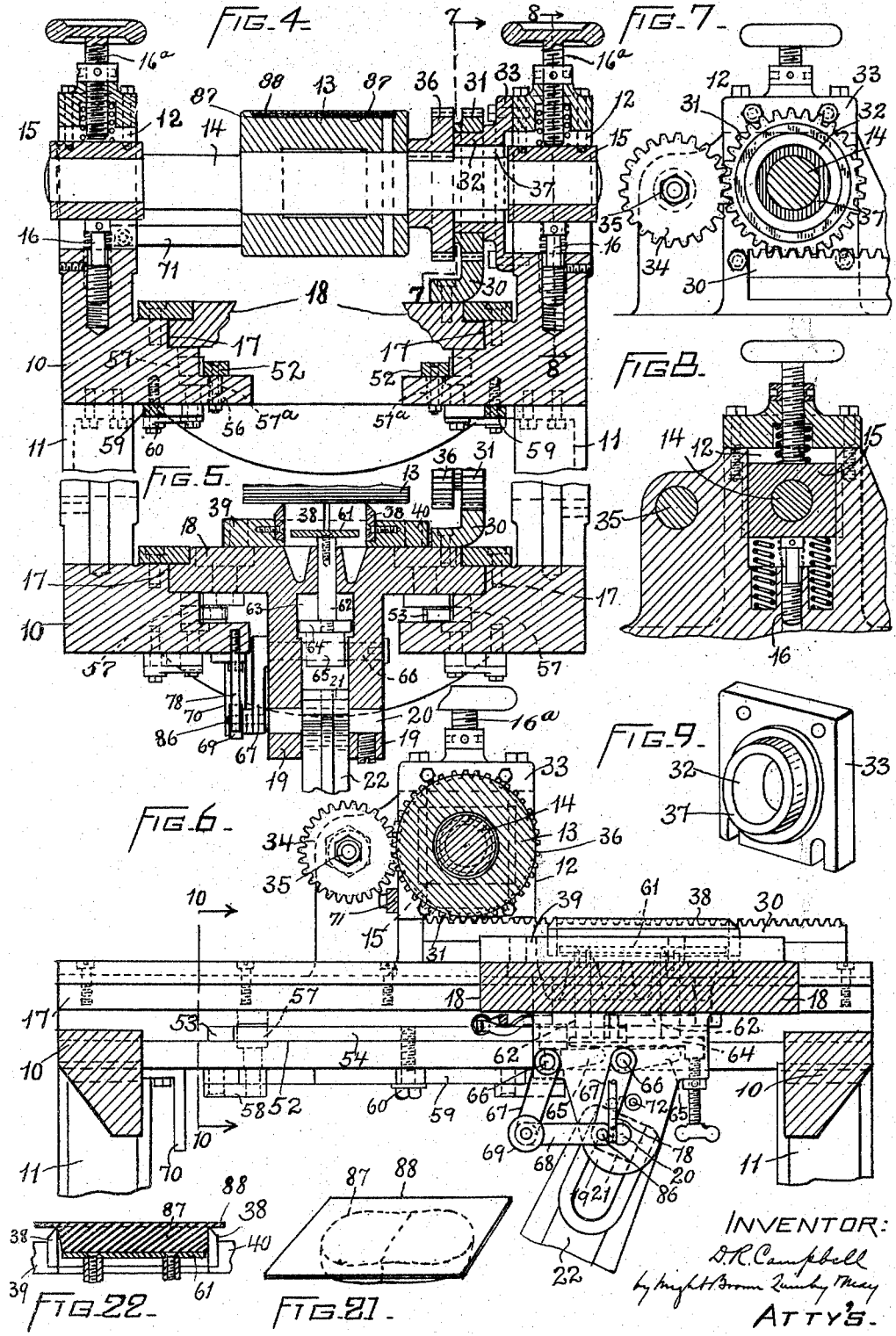

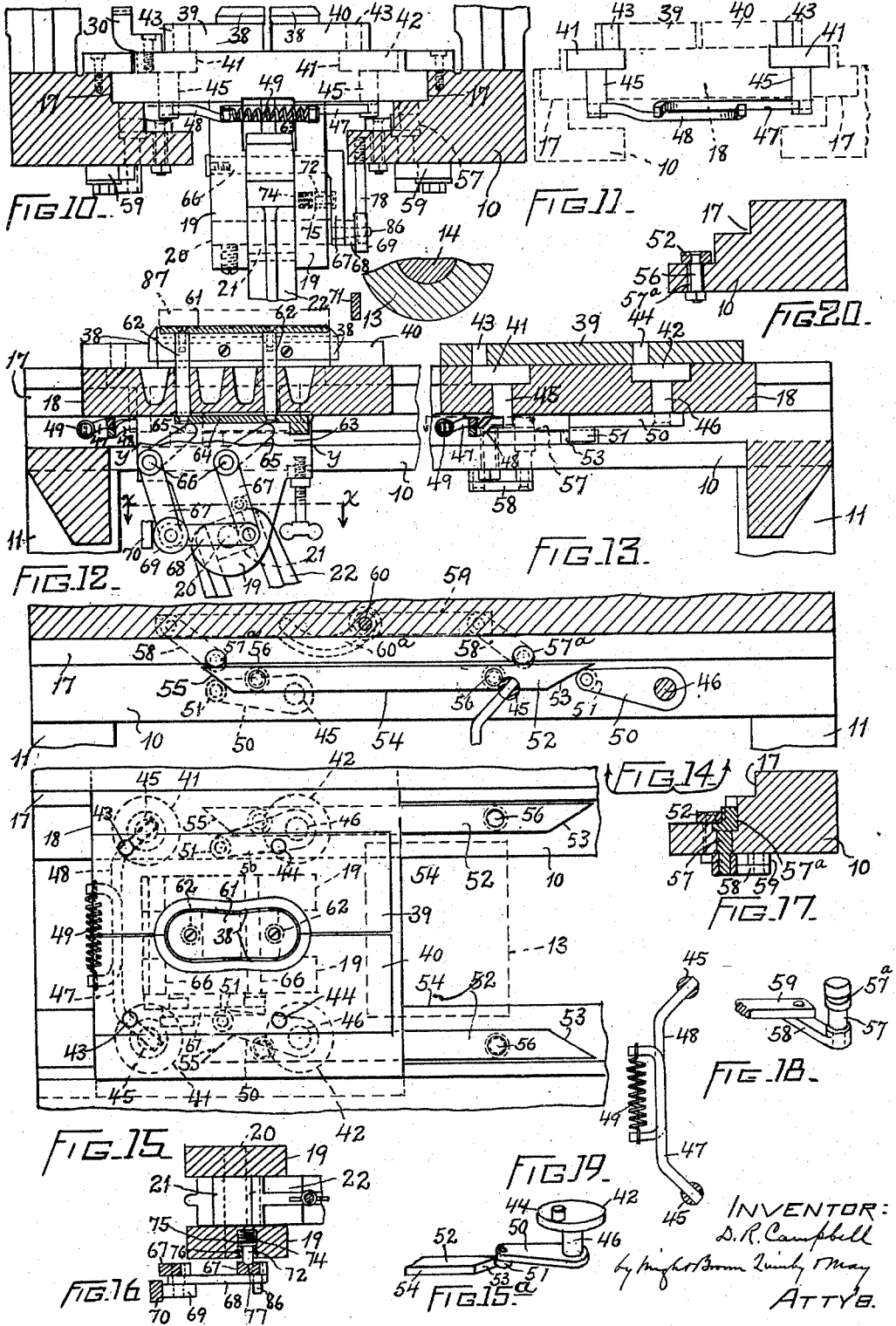

UNITED STATES PATENT OFFICE.

DUNCAN R. CAMPBELL, OF BOSTON, MASSACHUSETTS, ASSIGNOR TO FRANK RUMRILL, OF NEWTON, MASSACHUSETTS.

TRIMMING-MACHINE FOR RUBBER ARTICLES.

1,308,479.  Specification of Letters Patent.  Patented July 1, 1919.

Application filed July 29, 1918. Serial No. 247,161.

*To all whom it may concern:*

Be it known that I, DUNCAN R. CAMPBELL, a subject of the Dominion of Canada, residing at Boston, in the county of Suffolk and State of Massachusetts, have invented new and useful Improvements in Trimming-Machines for Rubber Articles, of which the following is a specification.

This invention relates to machines for removing the "overhang or fin" from articles such as molded rubber heels for boots and shoes, and it is embodied in the improvements which I will now proceed to describe and claim.

Of the accompanying drawings forming a part of this specification,—

Figure 1 is a top plan view of a machine embodying the invention.

Fig. 1ª is a plan view of the machine with the upper portion removed.

Fig. 2 is a side elevation, partly in section.

Fig. 2ª is a detail hereinafter referred to.

Fig. 3 is an end view of the machine.

Fig. 3ª is a sectional view of the pressure roll.

Fig. 4 is a section on line 4—4 of Fig. 1.

Fig. 5 is a section on line 5—5 of Fig. 1.

Fig. 6 is a section on line 6—6 of Fig. 1.

Fig. 7 is a section on line 7—7 of Fig. 4.

Fig. 8 is a section on line 8—8 of Fig. 1.

Fig. 9 is a perspective view of one of the parts of the machine.

Fig. 10 is a section on line 10—10 of Fig. 6.

Fig. 11 is a fragmentary view hereinafter referred to.

Figs. 12 and 13 are fragmentary vertical sections showing different positions, the slide hereinafter described, and certain details of mechanism associated therewith.

Fig. 14 is a view showing in section a portion of the frame below the slide and parts of the operating mechanism.

Fig. 15 is a fragmentary plan view, certain parts being removed.

Fig. 15ª is a fragmentary perspective view showing details.

Figs. 16 and 17 are fragmentary sectional views showing details.

Figs. 18 and 19 are fragmentary views showing other details.

Fig. 20 is a fragmentary sectional view showing a portion of the frame.

Fig. 21 is a perspective view of a heel having an overhang or fin.

Fig. 22 is a sectional view showing the heel in the die.

In the drawings, 10 represents a frame having suitable supports or legs 11. The frame 10 is provided with housings 12 which support a roll 13 mounted on a shaft 14 journaled in bearings 15, 15 adjustably supported relatively to the bed by screws 16 (Fig. 4) and confined against said supporting screws by bearing screws 16ª. Provision is thus made for vertically adjusting the roll to enable it to coöperate with variously proportioned cutting dies of the character hereinafter described.

The bed is provided with suitable guideways 17, in which is mounted a slide 18. Said slide is provided with lugs 19 (Figs. 5 and 6) having bearings for a wrist-pin 20, on which is mounted a journal-box 21 (Fig. 2) engaging a slot in the upper end of a pitman 22, the lower end of which is loosely mounted on the driving-shaft 23.

The driving-shaft is journaled in bearings in the lower portion of the frame and is provided with a driving pulley 24, releasably connected with the shaft by a clutch mechanism, hereinafter referred to.

As shown in Figs. 1 and 3, the driving pulley is formed to engage a driving belt, and is provided with a gear 24ª. To the shaft 23 is keyed a small gear or pinion 25, meshing with a larger gear 26 (Figs. 2, 2ª and 3), mounted on a stud 27, on the supporting frame. The gear 26 oscillates the pitman 22 through a link 28 (Fig. 2) connected at 29 with the gear and at 29ª with the pitman.

Attached to the slide 18 is a rack 30 which meshes with a primary gear 31 journaled on a fixed sleeve or tubular external bearing 32 (Fig. 9), formed on a casting 33, bolted to the housing 12. The primary gear 31 meshes with a connecting gear 34 journaled on a fixed stud 35 on the frame. The connecting gear 34 is of sufficient width to mesh with the gear 31 and with a secondary gear 36, keyed to the roll shaft 14, so that the connecting gear transmits motion to said shaft, and through the latter to the roll 13. Vertical adjustments of the roll without affecting the engagement of the gear 31 with the rack 30 are permitted, by reason of the fact that the inner diameter of the sleeve 32 is greater than that of the roll shaft 14, so that a space 37 is provided for adjustments of the roll shaft, as clearly shown in Figs. 4 and 7. The rack 30, and gears 31, 34 and 36, therefore, constitute torque-transmitting connections between the slide 18 and roll 13, said connections being organized, as described, to be unaffected by adjustments of the roll.

Mounted upon the slide are two rectangular die blocks 39 and 40 (Figs. 1 and 3), the inner edges of which are formed to receive the die sections 38, 38, forming an expansible and contractible cutting die, and secured to the block by screws, as shown in Fig. 5. These die blocks are adapted to be moved inwardly to close, and outwardly to open the die formed by said sections.

The die is normally open to receive the heel 87 to be trimmed, and is automatically closed when it passes from its starting position shown by Fig. 1, under the pressure roll 13. After the die passes the roll it is automatically opened to permit the heel to be easily ejected before the die returns to its starting position. The means for opening and closing the die will be next described.

In Fig. 11 the slide 18, die blocks 39 and 40, and parts of the bed 10 are shown in dotted lines. The slide has recesses in its upper surface to provide seats for crank disks 41, 41, 42, 42, (Fig. 1$^a$), preferably four in number. Said disks are provided with eccentric wrist-pins 43, 43, 44, 44, and rock shafts 45, 46. Said shafts are journaled in and extend through the slide, and the shafts 45 are provided with crossed arms 47, 48, at their lower ends, extending inwardly, in opposite directions, and curved laterally at their free ends to engage a spring 49 (Fig. 1), which exerts pressure upon the shafts 45 to turn the wrist-pins 43 outwardly and cause said pins to hold the die blocks in the open position of the die. The die blocks are also engaged by the wrist-pins 44, 44 to effect the closing of the die blocks as next described.

The shafts 46, 46, are provided with arms 50, 50 (Figs. 13 and 14), the free ends of which carry rolls 51. Said rolls are adapted to be engaged by cam strips 52, to close the die before the latter passes forward under the pressure roll. This is effected by movement of the rolls 51 on the oblique end faces 53 and on the longitudinal straight edge faces 54 of the two cam strips 52, the cam strips acting through the crank disks 42 and wrist-pins 44 to close the die carriers against the tension of the die opening spring 49.

The cam strips 52 have oblique end faces 55 at their opposite ends, so that when the die has passed under the roll 13, and the heel has been trimmed, the rolls 51 may follow the faces 55 which permit the die to be opened by the spring 49.

The cam strips 52 are loosely and adjustably secured to the bed 10 by bolts 56 (Fig. 20). Said bolts are of smaller diameter than the openings 57$^a$ through which they pass, so that the strips may be laterally adjusted, by means including rock shafts 57 (Fig. 18) journaled in fixed bearings in the frame 10 and having eccentrics 57$^a$ bearing on the inner or rear edges of the cam strips, as clearly shown in Figs. 13 and 14. The rock shafts 57 are provided at their lower ends with arms 58 (Figs. 1$^a$ and 18), the free ends of which are pivoted to links 59 secured to the frame by bolts 60, which engage curved slots 60$^a$ in the links corresponding to the radius of the arms 58, so that when an endwise movement is imparted to the links by hand, or otherwise, the rock shafts 57 are turned in their bearings, and the eccentrics 57$^a$ are correspondingly turned to laterally adjust the cam strips 52, (see Figs. 14, 17 and 18). The object of the lateral adjustability of the cam strips is to enable dies of different sizes to be used interchangeably.

The heel blank 87 in the present instance, is double (Figs. 21 and 22), and after being trimmed, is divided at the center on the dotted line in Fig. 21, into two heels, but single heels can be treated by suitably forming the die. As hereinbefore stated, the die after passing under the pressure roll 13, is automatically opened, and then the heel is ejected therefrom by means best shown in Figs. 5, 6, 10, 12 and 16.

Fig. 12 shows a section through the center of the slide 18, one of the lugs 19 being broken away at $y, y$ for clearness, and the lower portion of said lug being shown in elevation. In this figure the slide 18 is at the end of its forward movement, and in Fig. 6, it is in its initial or starting position. When the heel is placed in the die, it rests upon a supporting or ejector plate 61 (Fig. 5). Said plate is adjustably supported by means including plungers 62, projecting downwardly through the slide into the space 63, between the lugs 19. To the lower ends of the plungers 62 is secured a plate 64, resting on arms 65, on rock shafts 66, journaled in bearings in the lugs 19.

Each of the rock shafts 66 is provided with an arm 67. To the free ends of said arms are pivoted the ends of a connecting link 68 (Fig. 6). On one end of the link 68 is mounted a disk 69, the arrangement being such that when the slide moves to the position shown in Fig. 12, the disk 69 engages a fixed abutment 70 at one end portion of the frame, causing the ejector plate to rise and raise the heel, as shown in Fig. 12, the plate 61 being raised slightly above the edge of the die, so that when the latter is moved toward the pressure roll upon the return stroke, the heel resting on the plate, as shown in dotted lines in Fig. 12, will encounter a scraper 71, secured to the housing frame at the rear of the roll, which scraper removes the heel from the die. The scraper has been omitted from Fig. 1ª to avoid confusion. The abutment 70 is in the path of the disk 69, and contacts with the latter just before the completion of the forward movement of the slide.

It is necessary to provide means to maintain the ejecting plate in its elevated position when, on the return stroke of the slide, the disk 69 is separated from the abutment 70, so that there will be no liability of the heel dropping into the die before the scraper operates to remove the heel from the die. To this end I provide a friction device in one of the lugs 19, which device includes a spring-pressed pin or detent 72 (Fig. 16), projecting from the lug into the path of one of the arms 67, so that it may engage said arm when the latter is swung to the ejecting position by the engagement of the disk 69 with the abutment 70, shown in Figs. 12 and 16.

The pin 72 is provided with a head (Fig. 16) which rests against a spring 74, located in a bore 75 in the lug 19, which bore is screw-threaded to receive a bushing 76 which holds the pin against displacement by the spring.

The arm 67 with which the pin engages has a slight depression 77, in which the outer rounded end of the pin may rest, as shown in Fig. 16. In order to restore the ejecting device to the depressed position shown in Figs. 5 and 6, I provide a fixed abutment 78, located at one end portion of the frame, and in the path of the link 68. Said abutment may be a rod screwed to the bed in position to engage a pin 86 on the link, and cause the arm 67 to be disengaged from the spring-pressed detent 72, as clearly shown in Fig. 6.

As hereinbefore stated, the driving-shaft 23 is connected with the driving pulley 24 through a suitable clutch mechanism. This may include a member 79, and is controlled by a treadle 80 mounted on a shaft 81, to which shaft is attached a finger 82, which finger controls a pin (not shown), adapted to be released when the operator depresses the treadle, and thus disengage the finger from the pin and connect the clutch with the driving-shaft. Any suitable type of clutch may be used for the purpose described.

83 (Fig. 2) represents an arm formed on the treadle shaft and having a roll 84 at its upper or free end. Said roll is adapted to be engaged by a cam 85 attached to the gear 26, the arrangement being such that when the treadle is depressed the arm 83 is raised, and the clutch is in operative position to rotate the shaft. The cam surface engages the roll and retains the connection between the clutch and driving-shaft until the slide has returned to its starting position. When the roll has ceased to engage the cam, the clutch is disengaged from the shaft.

*Operation.*

When the slide 18 is in its starting position, as shown by Figs. 1 and 6, the die sections are separated, and the heel 87 is inserted between the sections, with its fin overhanging the cutting edges. When the slide starts forward the die sections are closed by the coöperation of the cam strip faces 53 and rolls 51, before the advancing end of the die reaches the roll, the heel being therefore closely confined during the trimming operation. When the die has passed under the roll, the die sections are opened by the coöperation of the cam faces 55, rolls 51, spring 49, and the described intermediate mechanism, and the ejector is raised to elevate the heel, and remains raised until the trimmed heel has been removed and the slide nearly reaches its starting position. The ejector is then released and depressed to enable the die to receive another heel. The diameter of the roll 13 is equal to the pitch diameter of the gears 31 and 36. This relation between the roll and gears, and the rotation of the gears by the rack 30 attached to the slide, cause the periphery of the roll and the cutting edges of the die sections to move at the same rate of speed, so that the overhang or fin is trimmed accurately and smoothly.

The roll 13 is preferably provided with a flexible and slightly yielding face, formed by applying a bed layer 87 of compressible sheet material, such as canvas, to a portion of the periphery of the roll body and superimposing a facing layer 88 of thin sheet steel, preferably of 20 gage, on the bed layer 87. Said layers constitute the portion of the periphery of the roll which contacts with the die, and may be secured to the roll by screws 89. The flexible and yielding face thus provided compensates for inequalities in the height of the cutting edges of the die and improves the trimming operation.

I claim:

1. A machine of the character stated, comprising a frame having guides, a slide movable on said guides, a trimming die carried by the slide, a rotary pressure roll adapted to coöperate with said die and adjustable relatively thereto, the frame being provided with means permitting adjustments of the roll toward and from the slide, means for reciprocating the slide, and torque-transmitting connections between the slide and roll, including a rack attached to the slide, a primary gear meshing with the rack and having a fixed axis, a secondary gear attached to the roll and adjustable therewith, said gears having pitch lines of equal diameter, and a connecting gear having a fixed axis and meshing with said primary and secondary gears.

2. A machine of the character stated, comprising a frame having guides, a slide movable on said guides, a trimming die carried by the slide, a rotary pressure roll adapted to coöperate with said die and adjustable relatively thereto, the frame being provided with means permitting adjustments of the roll toward and from the slide, means for reciprocating the slide, and torque-transmitting connections between the slide and roll, including a rack attached to the slide, a primary gear meshing with the rack and having a fixed axis, a secondary gear attached to the roll and adjustable therewith, said gears having pitch lines of equal diameter, and the roll having a diameter equal to that of the said pitch lines, and a connecting gear having a fixed axis and meshing with said primary and secondary gears.

3. A machine of the character stated, comprising a frame having guides, a pair of adjustable internal bearings, and a fixed external bearing, a slide movable on said guides, means for reciprocating the slide, a trimming die, carried by the slide, a pressure roll having a shaft journaled in said adjustable bearings and adapted to coöperate with said die, and means for rotating the roll, said means including a rack attached to the slide, a primary gear journaled on said fixed bearing and meshing with said rack, a secondary gear attached to the roll shaft, and located beside the primary gear, said primary and secondary gears being of equal diameter, and a connecting gear having a fixed axis and meshing with the primary and secondary gears, the said fixed bearing being formed to permit lateral movements of the roll, its shaft, and the secondary gear.

4. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, and means actuated by movements of the slide for relatively moving said die blocks to expand and contract the die.

5. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, means actuated by movements of the slide for relatively moving said die blocks to expand and contract the die, an ejector movable within the die, and means actuated by movements of the slide for alternately raising and depressing said ejector.

6. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, a pair of oppositely facing cam strips secured to the frame and provided with straight longitudinal faces and with oblique end faces 53 and 55, a pair of rock shafts journaled in the slide and having eccentric wrist-pins engaged with the die blocks and arms provided with rolls arranged to bear on the faces of the cam strips, and means for yieldingly pressing said rolls against the cam strips, the arrangement being such that during the forward movement of the slide the arms are first moved inwardly by the faces 53 to contract the die, then held in die-contracting position by the longitudinal faces, and then permitted by the faces 55 to move outwardly and expand the die.

7. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, a pair of oppositely facing cam strips secured to the frame and provided with straight longitudinal faces and with oblique end faces 53 and 55, a pair of rock shafts journaled in the slide and having eccentric wrist-pins engaged with the die blocks and arms provided with rolls arranged to bear on the faces of the cam strips, another pair of rock shafts journaled in the slide and having eccentric wrist-pins engaged with the die blocks and arms 47 and 48 connected by a spring 49, adapted to act through the last-mentioned arms, rock shafts and wrist-pins to press the said rolls against the cam strips.

8. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, means actuated by movements of the slide for relatively moving said die blocks to expand and contract the die, an ejector plate movable in the die, plate-supporting means including a pair of rock shafts 66 journaled in bearings on the slide and provided with arms 65 and with arms 67 connected by a link, a fixed abutment at one end portion of the frame adapted to coöperate with said supporting means in raising the ejector plate, a detent adapted to yieldingly engage said supporting means and confine the ejector plate in a raised position, and a fixed abutment at the opposite end portion of the frame adapted to disengage the supporting means from said detent and permit the depression of the ejector plate.

9. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, a pair of oppositely facing cam strips secured to the frame and provided with straight longitudinal faces and with oblique end faces 53 and 55, a pair of rock shafts journaled in the slide and having eccentric wrist-pins engaged with the die blocks and arms provided with rolls arranged to bear on the faces of the cam strips, means for yieldingly pressing said rolls against the cam strips, the said strips being loosely connected with the frame to permit their lateral adjustment and a variation of the distance between them, and means for laterally adjusting the strips and maintaining them at various adjustments.

10. A machine of the character stated, comprising a frame having guides, a slide movable on said guides, die blocks mounted on the slide and movable relatively to each other, die sections attached to said blocks and relatively movable thereby to expand and contract the die formed by said sections, means for reciprocating the slide, torque-transmitting connections between the slide and roll, a pair of oppositely facing cam strips secured to the frame and provided with straight longitudinal faces and with oblique end faces 53 and 55, a pair of rock shafts journaled in the slide and having eccentric wrist-pins engaged with the die blocks and arms provided with rolls arranged to bear on the faces of the cam strips, means for yieldingly pressing said rolls against the cam strips, the said strips being loosely connected with the frame to permit their lateral adjustment and a variation of the distance between them, and means for laterally adjusting the strips and maintaining them at various adjustments, said means including rock shafts 57 journaled in the frame, and provided with eccentrics 57ᵃ bearing on the backs of the cam strips, and with arms 58, links 59 connecting said arms, and each provided with an arcuate slot, and fixed studs on the frame entering said slots.

11. In a machine of the character stated, in combination, an elongated trimming die, and a rotary pressure roll adapted to coöperate with the die and comprising a rigid body, a flexible hard metal facing layer contacting with the die, and a bed layer of compressible material interposed between said facing layer and body.

In testimony whereof I have affixed my signature.

DUNCAN R. CAMPBELL.

Copies of this patent may be obtained for five cents each, by addressing the "Commissioner of Patents, Washington, D. C."